May 21, 1957 E. SCHRAMM 2,792,993

CALCULATING DEVICE

Filed March 31, 1953 3 Sheets-Sheet 1

INVENTOR.
ELLA SCHRAMM

BY Zoltan H. Polachek
ATTORNEY

May 21, 1957 E. SCHRAMM 2,792,993

CALCULATING DEVICE

Filed March 31, 1953 3 Sheets-Sheet 2

INVENTOR.
ELLA SCHRAMM

BY Zoltan H. Polachek

ATTORNEY

May 21, 1957 E. SCHRAMM 2,792,993

CALCULATING DEVICE

Filed March 31, 1953 3 Sheets-Sheet 3

INVENTOR.
ELLA SCHRAMM
BY
Zoltan H. Polachek
ATTORNEY

United States Patent Office 2,792,993

Patented May 21, 1957

2,792,993

CALCULATING DEVICE

Ella Schramm, Brooklyn, N. Y.

Application March 31, 1953, Serial No. 345,797

2 Claims. (Cl. 235—88)

This invention relates to new and useful improvements in calculator devices.

More particularly, the present invention proposes the construction of an improved calculator device the operation of which is self evident and which can easily and accurately be used by beginners and non-mathematicians as well as by more experienced mathematicians.

Another object of the present invention proposes forming the calculator device so that either the products or the quotients of a series of numbers in regular sequence on the front panel of the device can be read at a glance without error.

Still further, the present invention proposes constructing the calculator device with a front panel having a single upper panel opening to disclose a series of numbers on a disc one at a time and a plurality of lower panel openings to disclose the products of such numbers on annular lines on the disc when such numbers are multiplied by numbers printed on the front panel in regular sequence.

As a further object, the present invention proposes arranging the disc numbers on the opaque portions of two half opaque and half transparent superposed discs so that disc numbers may quickly be placed in register with the panel openings and so that the numbers on the lower disc may be read through the transparent portion of the upper disc when the discs are so aligned beneath the panel openings.

For further comprehension of the invention and of the objects and advantages thereof, reference will be had to the following description and accompanying drawings, and to the appended claims in which the various novel features of the invention are more particularly set forth.

In the accompanying drawings forming a material part of this disclosure:

Figure 1:
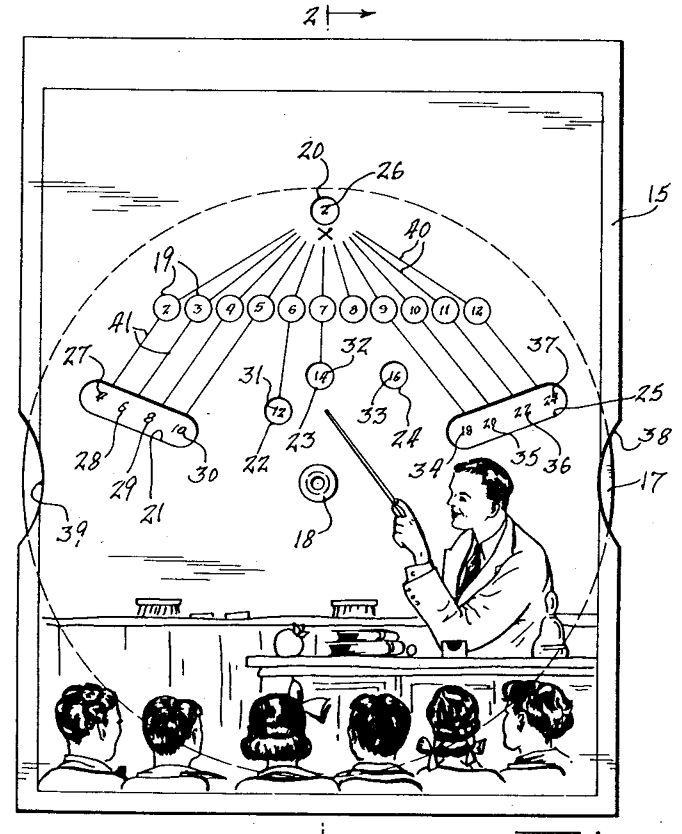
Fig. 1 is a front view of the calculator device of the present invention.
Figure 2:
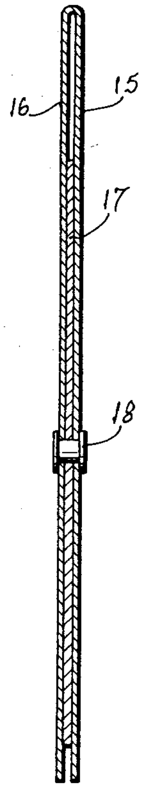
Fig. 2 is a sectional view taken on line 2—2 of Fig. 1.
Figure 3:
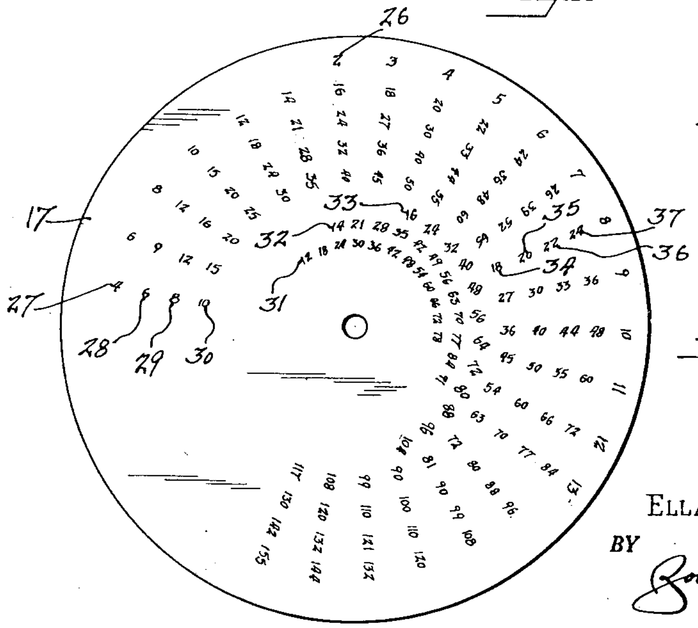
Fig. 3 is a front view of the disc shown in Figs. 1 and 2.
Figure 4:
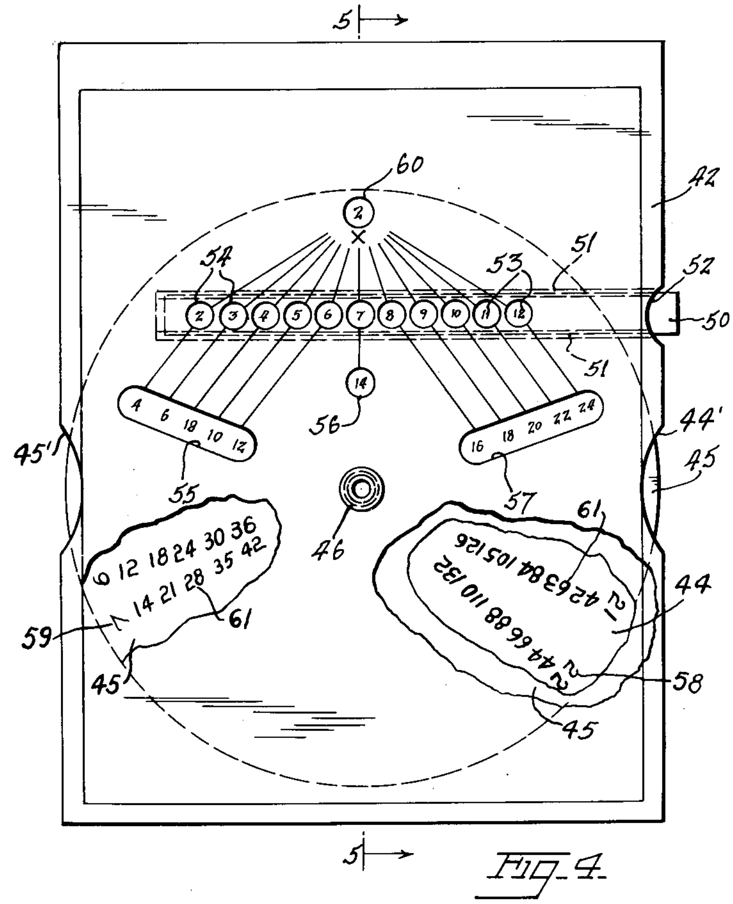
Fig. 4 is a view similar to Fig. 1 but illustrating a modification of the present invention, parts being broken away.
Figure 5:
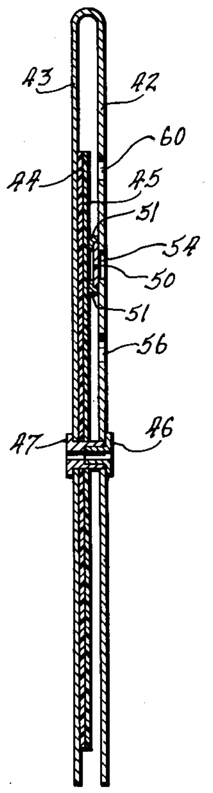
Fig. 5 is a sectional view taken on line 5—5 of Fig. 4.
Figure 6:
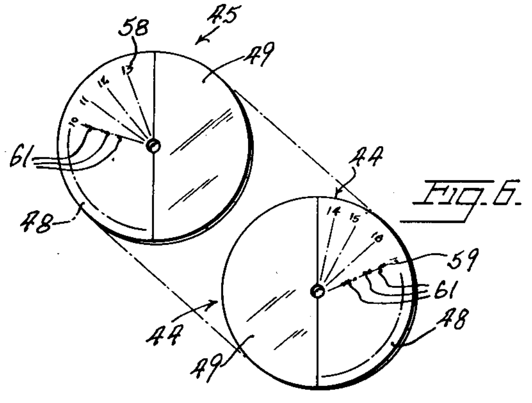
Fig. 6 is a front view of the two discs shown in Fig. 5 but showing the disc in reduced scale.
Figures 7, 8:
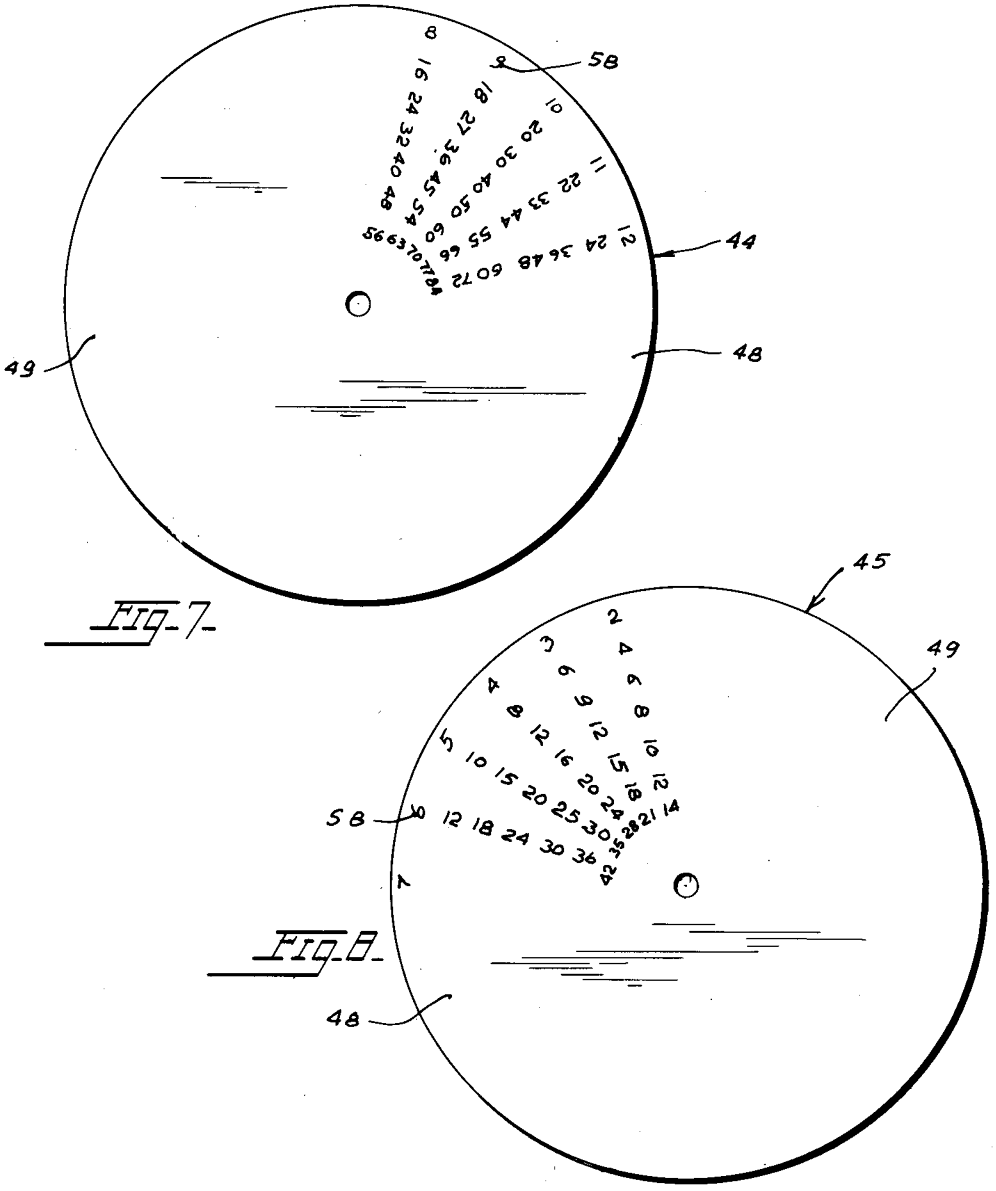
Figs. 7 and 8 are top plan views of the discs of Fig. 4.
Figure 9:
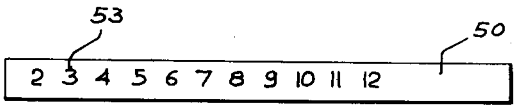
Fig. 9 is a top plan view of the slide member.

The calculator device, in accordance with the first form of the invention illustrated in Figs. 1 to 3, inclusive, has a front panel 15, a rear panel 16, a disc 17 and a ring rivet 18. The front and rear panels are joined together at their upper ends and preferably are made integral from a single sheet of thermoplastic, plastic, cardboard, sheet metal, or other similar material.

Disc 17 is centrally secured rotatably to the front panel 15 at the rear thereof by the rivet 18.

Panel 15 has printed on its face any suitable scene, such as the school scene shown and it also has printed thereon a series of indicia 19, all the indicia of this series being numerals or numbers in regular sequence and aligned in a straight row across the front panel. The indicia or numbers 19 are each enclosed in a circle drawn around them.

At one side of the series of indicia 19, i. e. above the central numbers in the series, is a panel opening 20. This upper panel opening 20 is above and aligned with the center of disc 17 as well as being above the series of panel numbers 19.

Below the panel numbers 19 on the front panel 15 are a plurality of lower panel openings 21, 22, 23, 24 and 25.

Disc 17 has a series of indicia 26 on its face (see Fig. 3) adjacent the panel and disposed in an annular line on the disc to register such indicia seriatim with the upper panel opening 20. The series of indicia 26 on the disc 17 is a series of numbers in regular sequence from "2" to "13" and radially spaced on the disc near the periphery thereof.

Disc 17 also has other series of indicia 27 to 37, inclusive, in the form of series of numbers disposed in concentric annular lines on the face of the disc to register with the lower panel openings 21 to 25, inclusive. The lower panel openings 21 and 25 are elongated slots adapted to disclose seriatim the numbers in the series of numbers 27 through 30 and 34 through 37, respectively. The lower panel openings 22, 23 and 24 are circular and disposed to disclose seriatim the numbers in the series of numbers 31, 32 and 33, respectively. In this manner, the numbers on the disc register with the panel openings as the disc is rotated.

Front panel 15 has a recessed portion 38 at one peripheral edge and a similar recessed portion 39 at the opposite peripheral edge to expose the periphery of the disc 17 for rotation of the disc between the panels.

The series of numbers 27 to 37 on the disc 17, i. e. the lower panel openings registering numbers, are arranged to yield the products of the panel numbers 19 multiplied by the number in the disc series of numbers 26 which appears in the upper panel opening 20.

Front panel 15 also has printed on its face a multiplication sign "×" beneath the upper panel opening 20 and guide lines 40 extending from the upper panel opening 20 to each of the panel numbers 19. Additional lines 41 extend from each of the panel numbers 19 to a point adjacent the lower panel opening where the product of that number times the disc number 26 appears.

To multiply with the calculator, a person needs only to rotate the disc 17 through the finger recesses 38 or 39 in the panels until the panel number desired in the regular series of numbers 26 on the disc appears in the upper panel opening 20. This number, which, by way of example, is "2" in Fig. 1, multiplied by the number "2" in the panel numbers gives a product of "4" in the lower panel opening 21. To divide, the number "2" in the upper panel opening 20 becomes the quotient of the number "4" in the lower panel opening 21 divided by the number "2" in the series of panel numbers 26.

The modification of the present invention illustrated in Figs. 4 to 9 is characterized by the provision of a front panel 42 and rear panel 43 joined together at one end with two discs 44 and 45 centrally secured rotatably and removably in superposed position between the panels 42 and 43 by the press fitting coacting rivet members 46 and 47. The discs are relatively rotatable by grasping the peripheries thereof through the opposed recesses 44′ and 45′ in the side edges of the front panel 42.

The disc 45 has an opaque portion 48 (see Fig. 6) and a transparent portion 49 while disc 44 is completely transparent. A panel slide member 50 is slidably secured to the front panel 42 by guides 51 on the rear of the front panel. A finger recess 52 is provided in the side periphery of the front panel 42 adjacent the end of the slide member 50 projecting from the front panel. A series of numbers 53 in regular sequence is printed on the slide member 50 and openings 54 are provided in the front panel 42 to disclose the numbers on the slide member. In this manner different series of numbers may be used, various slide members being made up as desired.

The front panel 42 also has a plurality of spaced lower panel openings 55, 56 and 57 below the front panel numbers 53 but above the centers of the discs 44 and 45.

Disc 44 has a series of numbers 58 and disc 45 a series of numbers 59 on its opaque portion 48 in regular sequence adapted to register with the upper panel opening 60 provided in the front panel, the numbers on one disc being a continuation of the sequence begun on the other disc. The discs also have a plurality of series of numbers 61 disposed in concentric annular lines continuing from one disc to the other and adapted to register seriatim with the lower panel openings, these lower panel registering numbers being the products of the front panel numbers multiplied by the upper panel opening registering numbers on the discs. When a disc is moved to bring its numbers into registry with window 60, the other disc is rotated to bring its transparent portion into registry with the windows. By providing two discs the series 58 and 59 of numbers may be quickly moved into registry with the panel opening 60.

The discs 44 and 45, being removable, can be changed as the slide members 50 are changed so that the correctly correlated answers for the particular slide member being used can be inserted.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A calculator device comprising a rectangular U-shaped panel constituting front and rear sections, a sectional and demountable rivet connecting said sections centrally thereof, said front section having upper and lower aligned circular openings along its longitudinal center, a series of transversely disposed circular openings, a pair of elongated openings arranged at an angle to the horizontal on both sides of its longitudinal center, a disc rotatably mounted on said rivet between said front and rear sections, and an elongated slidable member slidably mounted on the rear section between said sections, across the horizontally disposed circular openings, a series of numbers along the peripheral edge of said disc visible through the upper central opening and constituting the multipliers of an example in arithmetic, a series of numbers on said slidable member visible through said horizontally disposed openings and constituting the multiplicands, and a plurality of series of radially disposed numbers on the disc visible through the other openings in the front section and constituting the results of multiplying said multipliers and multiplicands, said front section having a recess in one of its long edges to provide a clearance for grasping one end of said slidable member for manipulating the same and having a pair of opposed recesses in its side edges to provide clearances for grasping the disc for manipulating the same.

2. A calculator device comprising a rectangular U-shaped panel constituting front and rear sections, a sectional and demountable rivet connecting said sections centrally thereof, said front section having upper and lower aligned circular openings along its longitudinal center, a series of transversely disposed circular openings, a pair of elongated openings arranged at an angle to the horizontal on both sides of its longitudinal center, a pair of superposed discs rotatably mounted on said rivet between said front and rear sections, said discs being rotatable relative to each other, each of said discs having one-half of its area formed of opaque material and its other half being formed of transparent material, and an elongated slidable member slidably mounted on the rear section between said sections, across the horizontally disposed circular openings, a series of numbers along the peripheral edge of the opaque area of each disc, visible through the upper central opening and constituting the multipliers of an example in arithmetic, a series of numbers on said slidable member visible through said horizontally disposed openings and constituting the multiplicands, and a plurality of series of radially disposed numbers on the opaque area of each disc visible through the other openings in the front section and constituting the results of multiplying said multipliers and multiplicands, said front section having a recess in one of its long edges to provide a clearance for grasping one end of said slidable member for manipulating the same and having a pair of opposed recesses in its side edges to provide clearances for grasping the discs for manipulating the same.

References Cited in the file of this patent

UNITED STATES PATENTS

| | | |
|---|---|---|
| 623,415 | McCluskey | Apr. 18, 1899 |
| 634,779 | Tregoning | Oct. 10, 1899 |
| 804,646 | Young | Nov. 14, 1906 |
| 871,417 | Kenyon | Nov. 19, 1907 |
| 1,311,682 | Drew | July 29, 1919 |
| 1,346,930 | Zion | July 20, 1920 |
| 1,507,333 | Carroll | Sept. 2, 1924 |
| 1,728,584 | Wright | Sept. 17, 1929 |
| 1,992,366 | Fisher | Feb. 26, 1935 |
| 2,222,272 | Wesner | Nov. 19, 1940 |

FOREIGN PATENTS

| | | |
|---|---|---|
| 407,078 | Great Britain | Mar. 12, 1934 |